United States Patent

Jungling et al.

[11] Patent Number: 6,161,504
[45] Date of Patent: Dec. 19, 2000

[54] APPARATUS FOR COLLECTING LIVE MARINE ANIMALS

[76] Inventors: Werner Wilhelm Jungling; Timothy Norman Staier, both of 16 Hayward Road, Cooroy, Queensland, 4563, Australia

[21] Appl. No.: 09/176,250

[22] Filed: Oct. 21, 1998

[30] Foreign Application Priority Data

Oct. 24, 1997 [AU] Australia ............................... 42867/97

[51] Int. Cl.⁷ .................................................. A01K 63/00
[52] U.S. Cl. ........................... 119/215; 119/216; 119/226
[58] Field of Search .................................... 119/215, 216, 119/219, 226, 221, 223; 43/6.5

[56] References Cited

U.S. PATENT DOCUMENTS

| | | |
|---|---|---|
| 3,038,760 | 6/1962 | Crooke . |
| 3,040,980 | 6/1962 | Mann et al. . |
| 3,871,332 | 3/1975 | Hayashi ................................. 119/203 |
| 3,903,844 | 9/1975 | Greenia . |
| 4,046,996 | 9/1977 | Williams et al. ............................ 377/6 |
| 4,743,742 | 5/1988 | Espedalen ................................ 235/1 R |
| 4,798,168 | 1/1989 | Vadseth et al. ............................ 119/223 |
| 4,915,059 | 4/1990 | Long ........................................ 119/224 |
| 5,634,433 | 6/1997 | Schmitt . |
| 5,979,362 | 11/1999 | McRobert ................................ 119/227 |

FOREIGN PATENT DOCUMENTS 635166  8/1977  U.S.S.R. .

*Primary Examiner*—Peter M. Poon
*Assistant Examiner*—Yvonne R. Abbott
*Attorney, Agent, or Firm*—Hoffman, Wasson & Gitler

[57] ABSTRACT

An apparatus for collecting and discharging live marine animals, the apparatus having a collection chamber for holding the marine animals, an inlet conduit having one end extendible into a body of water containing the marine animals, and another end in fluid communication with the chamber, the conduit being sized to allow the marine animals to pass therethrough, a pump to suck water out of the chamber which also causes water to flow through the conduit and into the chamber thereby carrying the marine animals through the conduit and into the chamber, a screen to prevent the marine animals from being sucked into the pump, a discharge outlet through which the marine animals can pass out of the apparatus, and a mechanism the marine animals through the discharge outlet.

2 Claims, 9 Drawing Sheets

APPARATUS FOR COLLECTING LIVE MARINE ANIMALS

This invention relates to an apparatus for collecting marine animals. The invention is primarily used for collecting fish and therefore will be described in this context. However, the invention may be used to collect other marine animals including prawns, crabs and other crustaceans.

In the fish breeding industry, fish are maintained in large ponds. As the fish grow, or for other reasons, it is necessary to move the fish to another pond. It is not efficient to attempt to net the fish and this also causes stress, injury and death to some of the fish.

Therefore, pumps are used to pump water and fish from one pond to an adjacent pond. Whilst these pumps are designed to reduce injury to the fish, it is found that most known pumps are still unsatisfactory and too many fish are injured, stressed or killed as they pass through he pump.

It is an object of this invention to overcome some of the above disadvantages or provide the consumer with a useful or commercial choice.

In one form the invention resides in an apparatus for collecting live marine animals including a chamber for holding the live marine animals; an inlet for transferring the marine animals into the chamber; a pump to suck water through the chamber; and a prevention means located within the chamber to prevent the marine animals from being sucked into the pump.

Typically the marine animals are fish but other marine animals such as prawns or crabs may be collected.

The chamber may be sized according to the desired holding capacity of the apparatus. The chamber may be spilt into a number of sub-chambers. The chamber may be portable.

Preferably the prevention means is a screen. The screen may be fixed or movable within the chamber. The movable screen may be moved manually or mechanically. The screen may be in the form of a cage or basket that may be lifted out of the chamber.

The inlet may be in the form of an intake line. The intake line may be sized according to the size of the fish to be collected and the suction requirements of the apparatus.

A suction line may connect the pump to the chamber. The suction line may be sized also according to the suction requirements of the apparatus.

A discharge line may be used to expel water from the pump. The discharge line may discharge water back into the location from which it was originally obtained. Alternatively, the discharge line may be connected to a sub-chamber of the chamber to flush fish from the sub-chamber. Still alternatively, the discharge line may be connected to a holding tank. The holding tank may be used to flush the fish from the chamber or re-charge the chamber with water.

The pump may be of various suitable types. Preferably, an mixed flow, mono or centrifugal pump is used. The pump may be powered by conventional means including liquid fuel or electricity.

An outlet may be attached to the chamber to release the fish from the chamber. The outlet may be a number of conduits that are usually joined to each other. There are typically at least three conduits and preferably at least five conduits. The conduits may be sized so to be only slightly larger than the size of the fish. This may improve the speed of output of the fish through the conduits. Alternatively, the intake line may be used as the outlet.

A second discharge pump may be associated with the apparatus to flush the fish from the outlet or chamber.

Embodiments of the invention will be described with reference to the accompanying drawings in which.

Figure 1:
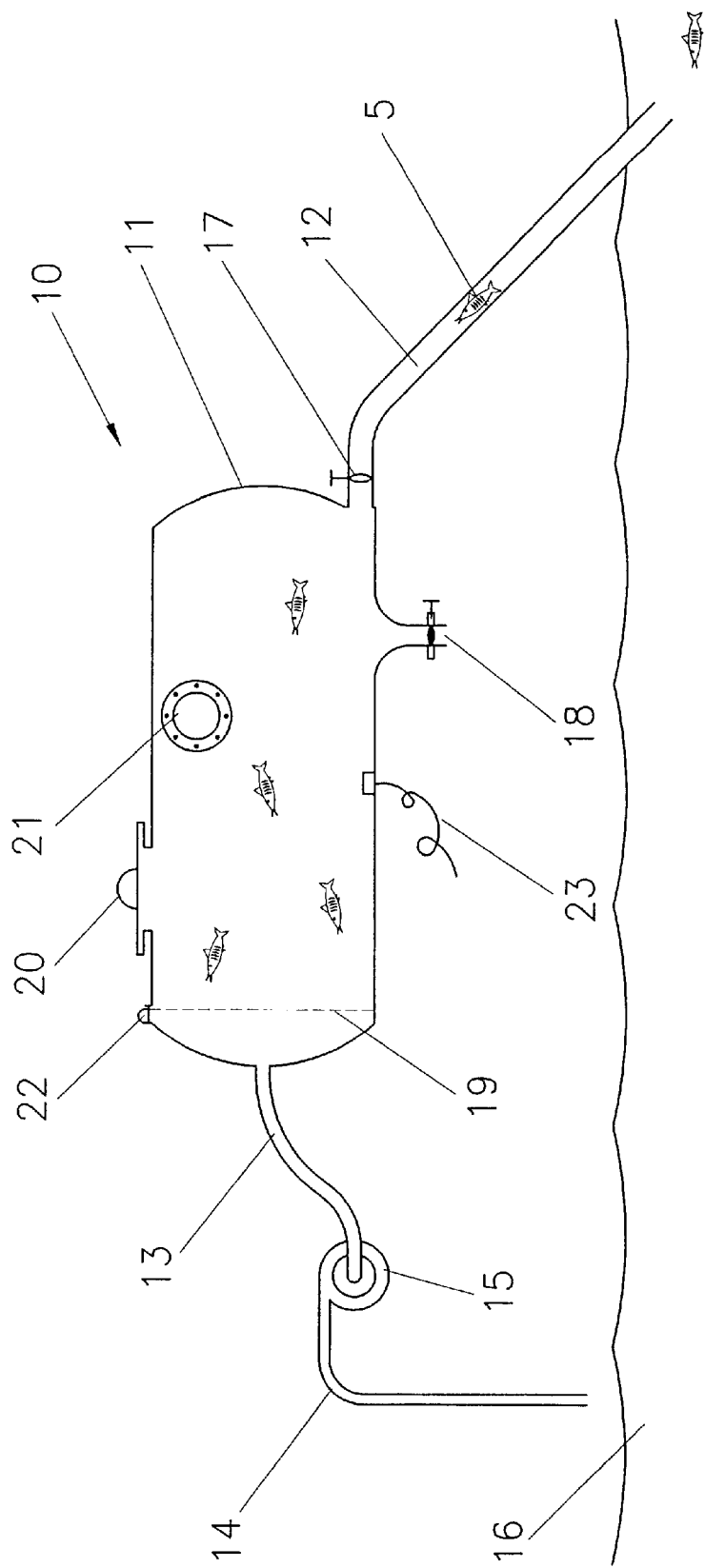
FIG. 1 is a schematic view of an apparatus for collecting live fish according to an embodiment of the invention.

FIG. 1 shows a basic apparatus 10 for collecting fish from a lake. The apparatus 10 has a holding chamber 11, an intake line 12, a suction line 13, a discharge line 14 and a pump 15.

The intake line 12 is connected to and extends from the chamber 11 to the lake 16. The intake line 12 has an internal diameter sufficient for fish, located within the lake 16, to be able to pass through the intake line 12. A ball valve 17 is located within the intake line 12 to prevent unwanted movement of the fish. An electronic light beam counter (not shown) is also located within the intake line 12 to determine the number of fish that have entered the chamber 11.

The suction line 13 extends from an opposite end of the chamber 11 to that of the intake line 12. The suction line 13 is connected to the pump 15 at the opposite end of the suction line 13 that is connected to the chamber 11.

The discharge line 14 extends from the pump 15 and allows water to be expelled back into the lake 16.

The pump 15, in this embodiment, is a centrifugal pump 15. However, the centrifugal pump 15 may be replaced with an mixed flow or mono pump with the pump providing the same function. The size of the pump 15 is dependant on a number of variables including the size of the fish, the size of the intake line 12 and the desired flow rate of the water through the intake line 12.

The chamber 11 is sized to accommodate approximately 20 fish. An outlet line 18 is located at the base of the chamber 11 to release the fish from the chamber 11.

A screen 19 extends across the chamber 11 adjacent to where the suction line 13 is connected to the chamber 11. The screen 19 prevents fish from being sucked through the suction line 13 and into the pump 15. Further, the screen 19 is spaced sufficiently away from the where the suction line 13 is connected to the chamber 11 so that the fish are not held against the screen 19 by the suction created by the pump 15.

A cover 20 is provided on the chamber 11 to gain access to the chamber 11 for maintenance purposes. A glass viewing window 21 is also located within the chamber 11 to view the fish within the chamber 11. An air bleed valve 22 is located on the chamber 11 to remove air from the chamber 11 to achieve efficient operation of the apparatus 10. An aeration connection point 23 is located on the chamber 11 for attachment of an oxygen source if the fish are to be held within the chamber 11 for an extended period of time.

Figure 2:
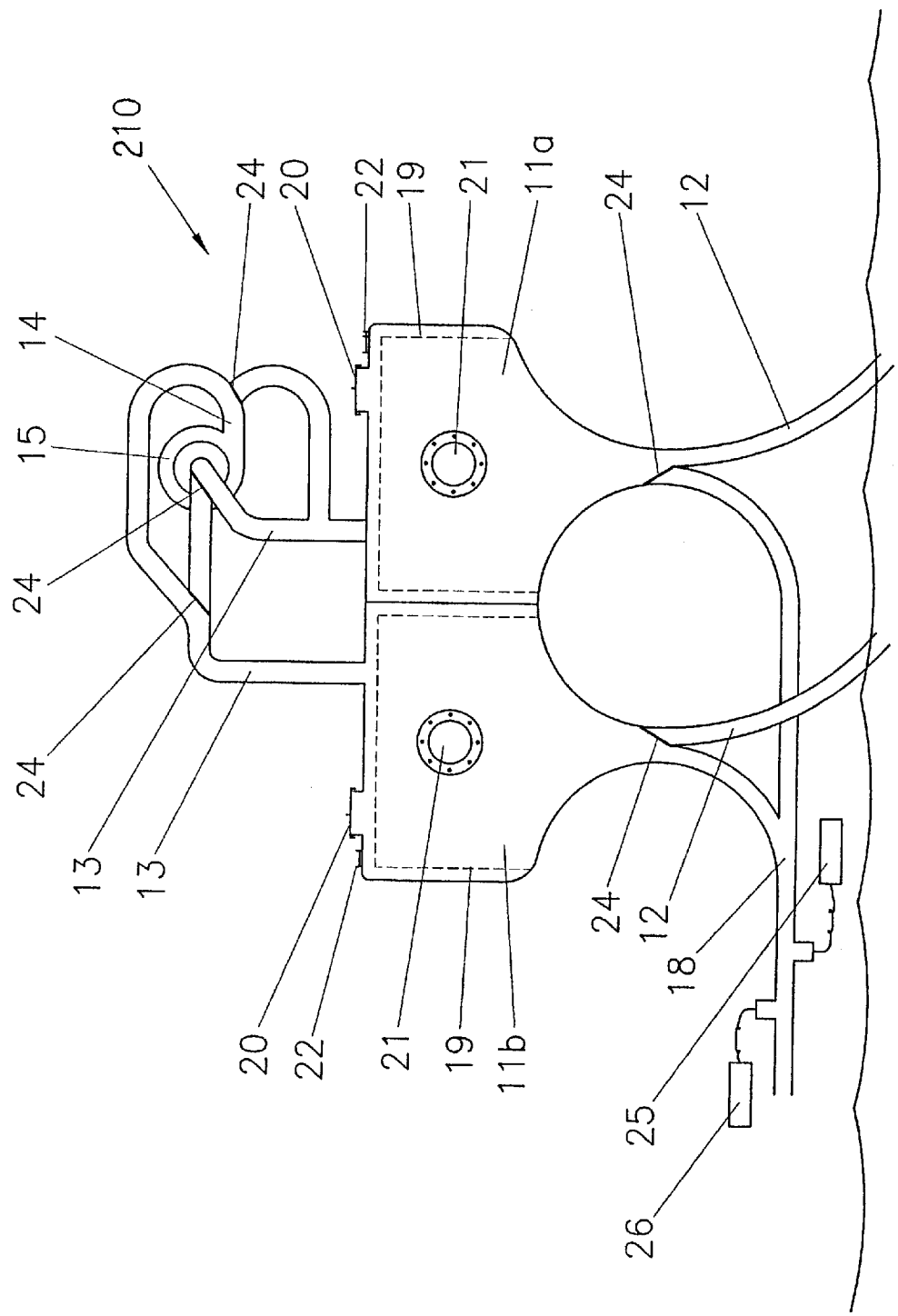
FIG. 2 is a schematic view of an apparatus for collecting live fish according to another embodiment of the invention.

FIG. 2 shows a further embodiment of an apparatus 210 for collecting fish. Like numerals of the previous embodiment have been used to describe like components of this embodiment.

The chamber 11 has been divided up into two sub-chambers 11A and 11B. Each of the sub-chambers has an associated intake line 12 and suction line 13.

An outlet line 18 is joined to both intake lines 12. The discharge line 14 is also joined to both of the suction lines 13. A number of flow direction valves 24 are located where the outlet line 18 and the intake lines 12, and the discharge line 14 and the suction lines 13 are joined. The flow direction valves determine the flow of the water through the apparatus 210.

The apparatus 10 operates by collecting fish in one of the sub-chambers 11A whilst discharging fish from the other sub-chamber 11B. Only one intake line and one suction line, associated with the same sub-chamber 11A, is operating at one time. The outlet line 18 and the discharge line 14 are being utilised by the other sub-chamber 11B. When the sub-chamber 11A, used for collecting fish, is full then the flow direction valves 24 can be switched so that the full sub-chamber 11A starts to discharge its fish. The other sub-chamber 11B then commences collecting fish. This allows for an automated fish collecting apparatus 210.

This apparatus 210 also has an electric light beam counter 25 associated with the outlet line 18 to determine the number of fish discharged from the apparatus 10. An ultrasonic cleaning apparatus 26 is also associated with the outlet line 18 to clean the apparatus 210. The ultrasonic cleaning apparatus 26 need not be located with the outlet line 18 but can be placed within the intake line 12 or the chamber 11.

Figure 3:
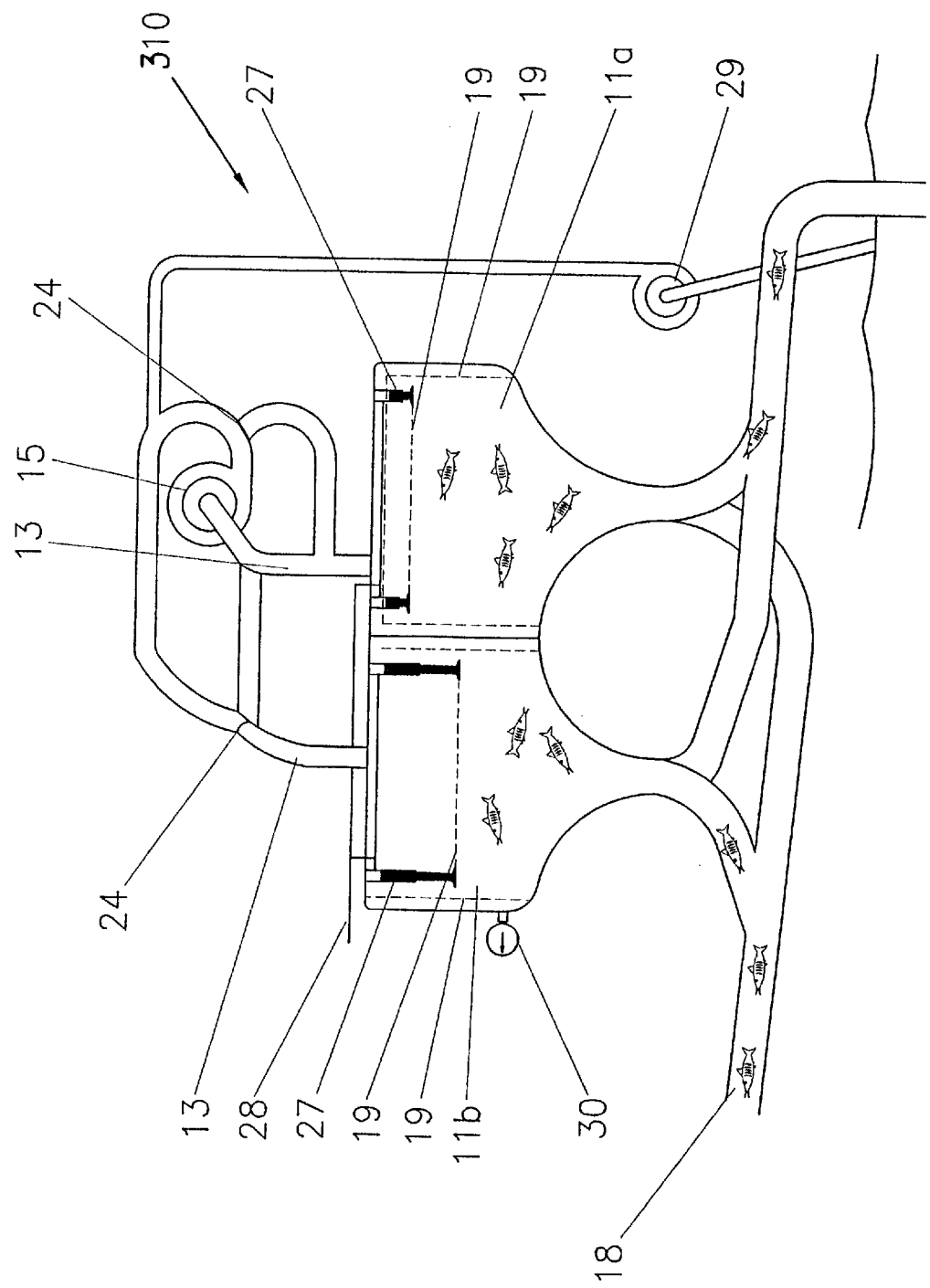
FIG. 3 is a schematic view of an apparatus for collecting live fish according to another embodiment of the invention.

FIG. 3 shows an apparatus 310 for collecting fish very similar to that shown in FIG. 2. Again like numerals of the previous embodiments have been used to describe like components.

The screens 19 located within each of the sub-chambers are connected to hydraulic cylinders 27. The hydraulic cylinders 27 are extended when the fish are to be discharged from the sub-chamber to encourage the fish from the sub-chamber. Similarly, the hydraulic cylinders 27 are retracted when the sub-chamber is used to collect fish. A hydraulic connection point 28 is located at the side of the chamber 11 attach a hydraulic power source (not shown).

A priming pump 29 is connected to the discharge line 14 to prime the pump 15 with water. A suitable type of priming pump 29 would be a mono pump.

A pressure gauge 30 is attached to the chamber 11 to indicate the pressure within each sub-chamber. If the pressure within each of the sub-chambers is to high, then the pump 15 can be slowed and visa-versa.

Figure 4:
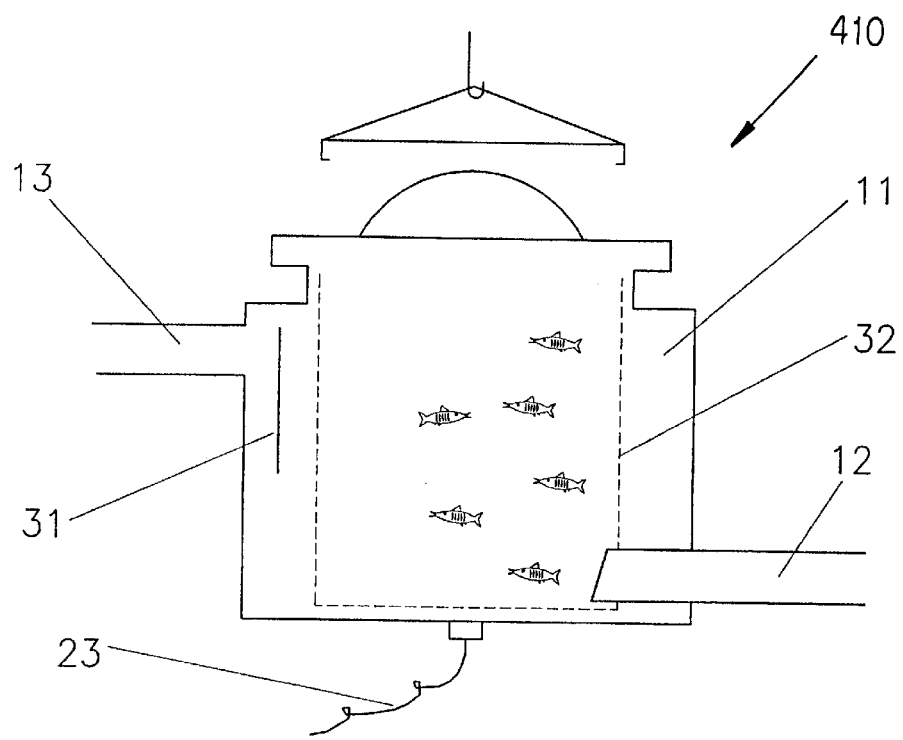
FIG. 4 is a schematic view of an apparatus for collecting live fish according to another embodiment of the invention.

FIG. 4 shows a basic apparatus 410 with modifications made in relation to the screen 19. The screen is in the form of a lift out basket 32. When the basket 32 become sufficiently full of fish, the basket 32 can be removed from the chamber 11.

Also, a baffle 31 is located adjacent to where the suction line 13 connects to the chamber 11. The baffle 31 prevents concentration of the suction of water to one location. This assists in preventing fish becoming held against the screen 19.

Figure 5:
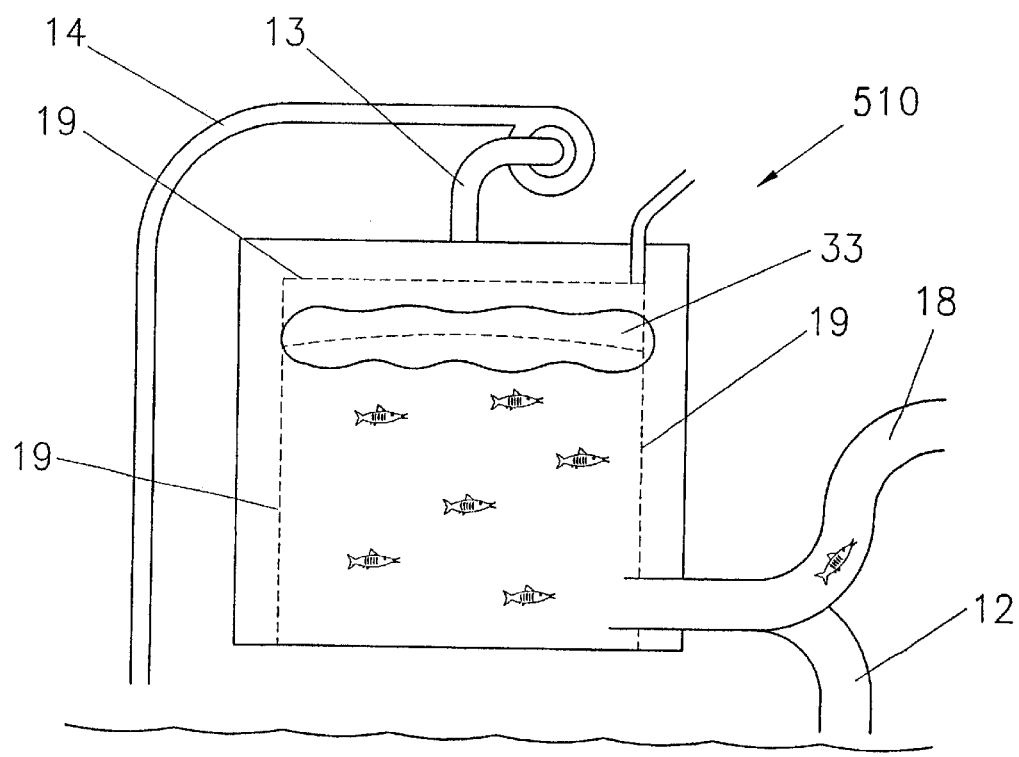
FIG. 5 is a schematic view of an apparatus for collecting live fish according to another embodiment of the invention.

FIG. 5 shows a basic apparatus 510 for collecting fish. An inflatable bladder 33 has been located within the chamber 11 to force the fish from the chamber 11 when the bladder is inflated.

Figure 6:
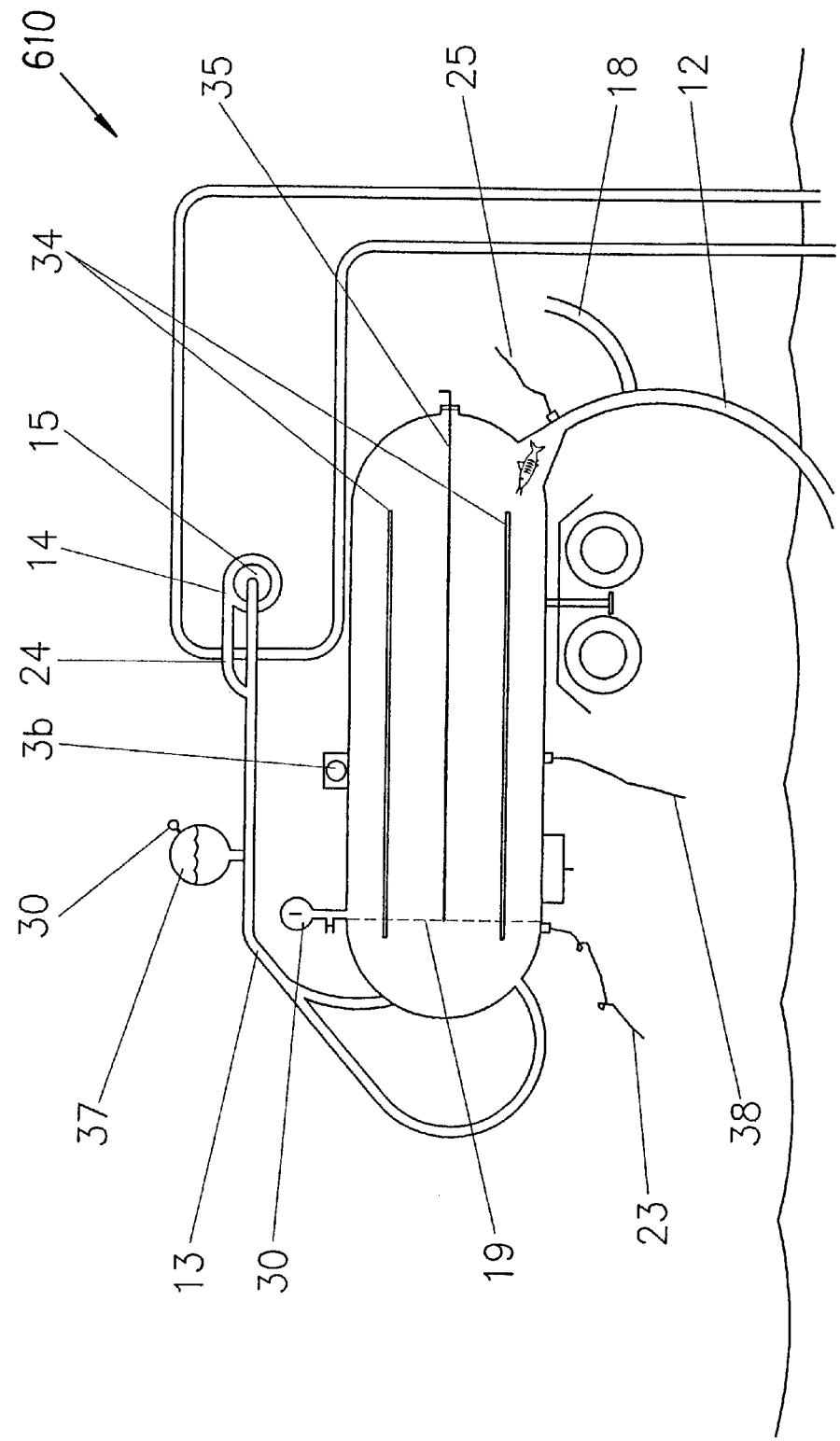
FIG. 6 is a schematic view of an apparatus for collecting live fish according to another embodiment of the invention.

FIG. 6 shows a trailer-mounted apparatus 610. Numerals used in previous embodiments have been used to describe like components in this embodiment.

Two rails 34 mount the screen 19 within the chamber 11 so that the screen 19 can be moved backward and forward. A bar 35 is attached to the screen 19 to move the screen 19. The bar 35 extends through the chamber 11 so that the bar 35 can be pushed or pulled manually to move the screen 19. The bar 35 is pulled to remove fish from the chamber 11 via the outlet line 18. The bar 35 is pushed to enable the largest space within the chamber 11 for the fish to be collected.

The pump 15, suction line 13 and discharge line 14 have been arranged so that as well as providing the suction required to capture fish, flushing of the chamber 11 can occur by switching flow direction valves 24. A pressure relief valve 36 is located on the chamber 11 to relieve pressure when necessary.

An accumulator 37 is used on the apparatus 610 to control pressure surges that are common, especially when using a mono pump. These pressure surges can damage or kill the fish. The accumulator 37 enables a smooth increase or decrease in water flow without pressure surges.

The suction line 13 is divided and connected to the chamber 11 at different points to enhance the flow of water through the apparatus 610. This is an alternative to using a baffle.

A temperature probe 38 is provided within the chamber 11 to monitor the temperature.

Figure 7:
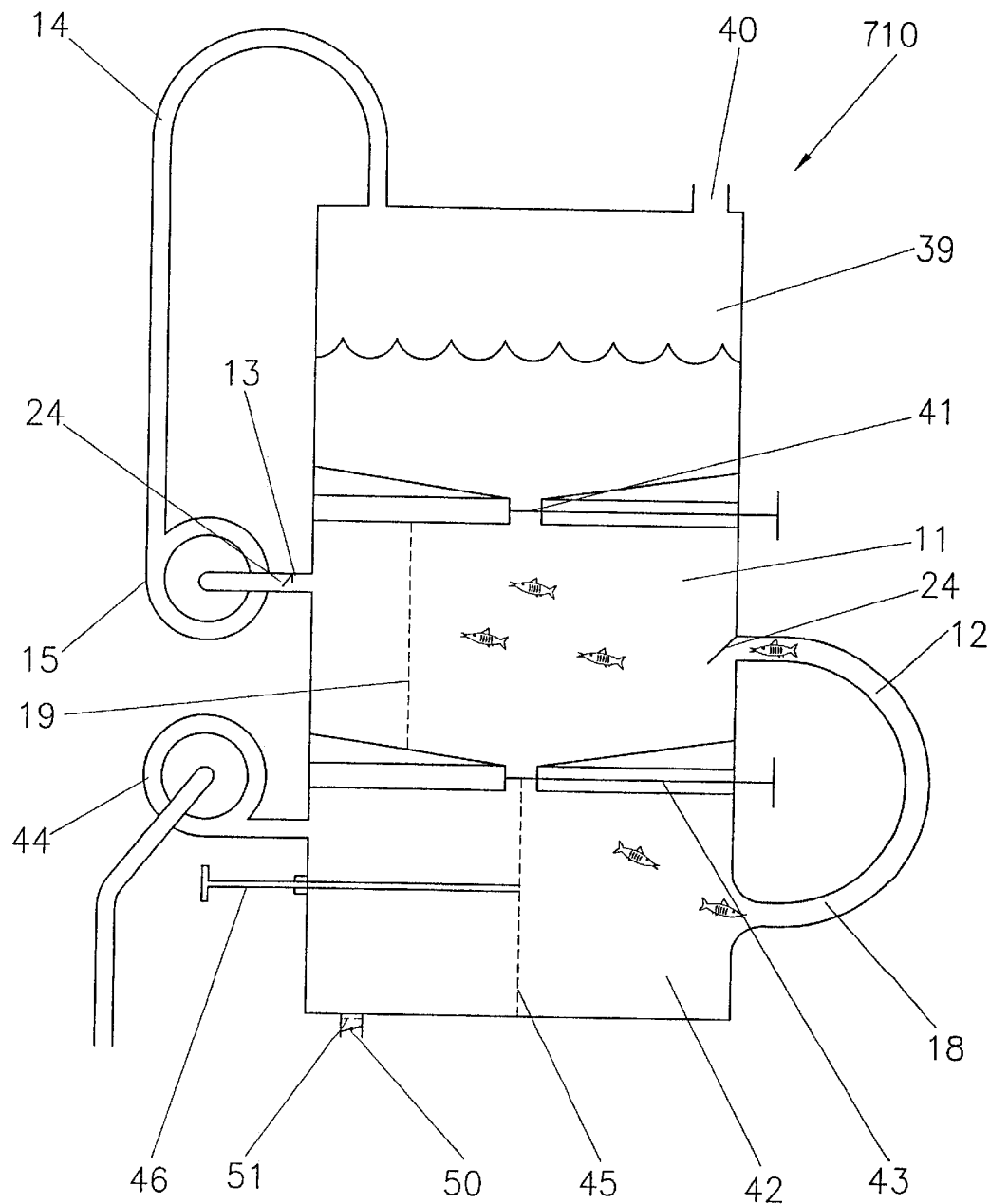
FIG. 7 is a schematic view of an apparatus for collecting live fish according to another embodiment of the invention.

FIG. 7 shows a further embodiment of an apparatus 710 for collecting fish. Again, the apparatus 710 has a chamber 11, a pump 15 with a screen 19, an inlet line, a suction line 13 and a discharge line 14.

A holding tank 39 is located above the chamber 11. The holding tank is filled with water by the discharge line 14 when the pump 15 is operating. An overflow valve 40 is provided on the holding tank 39. A slideable valve 41 separates the chamber 11 and the holding tank 39.

An outlet tank 42 is located below the chamber 11. A slidable valve 43 separates the chamber 11 and the outlet tank 42. A second pump 44 is connected to the outlet tank 42 to flush water through the tank 42 to discharge fish from the outlet tank 42. A moveable screen 45 with associated bar 46 is provided to assist in discharging the fish from the outlet tank 42.

In operation, the fish are sucked into the chamber 11 in the same manner as previously described. Water passing out of the discharge line 14 fills the holding tank 42. When a sufficient number of fish are located within the chamber 11, the slideable valve 43 located between the chamber 11 and the outlet tank is opened. A water valve 50 with associated screen 51, located at the base of the outlet tank, is also opened. Subsequently the fish and water flow into the outlet tank 42. When the chamber has been emptied, the water valve 50 is closed. The second pump 44 then commences operation to flush the fish from the tank 42. The bar 46 is pushed moving the screen 45 toward the outlet line 18 to remove any fish still remaining within the outlet tank 42.

During this period of time, the slideable valve 43 separating the chamber 11 and the outlet tank is closed. The slideable valve 41 between the holding tank 39 and the chamber 11 is then opened and water fills the chamber 11. The slideable valve 41 separating the chamber 11 and the holding tank is then closed. The chamber 11 is then recharged with water and ready to receive fish.

Figure 8:
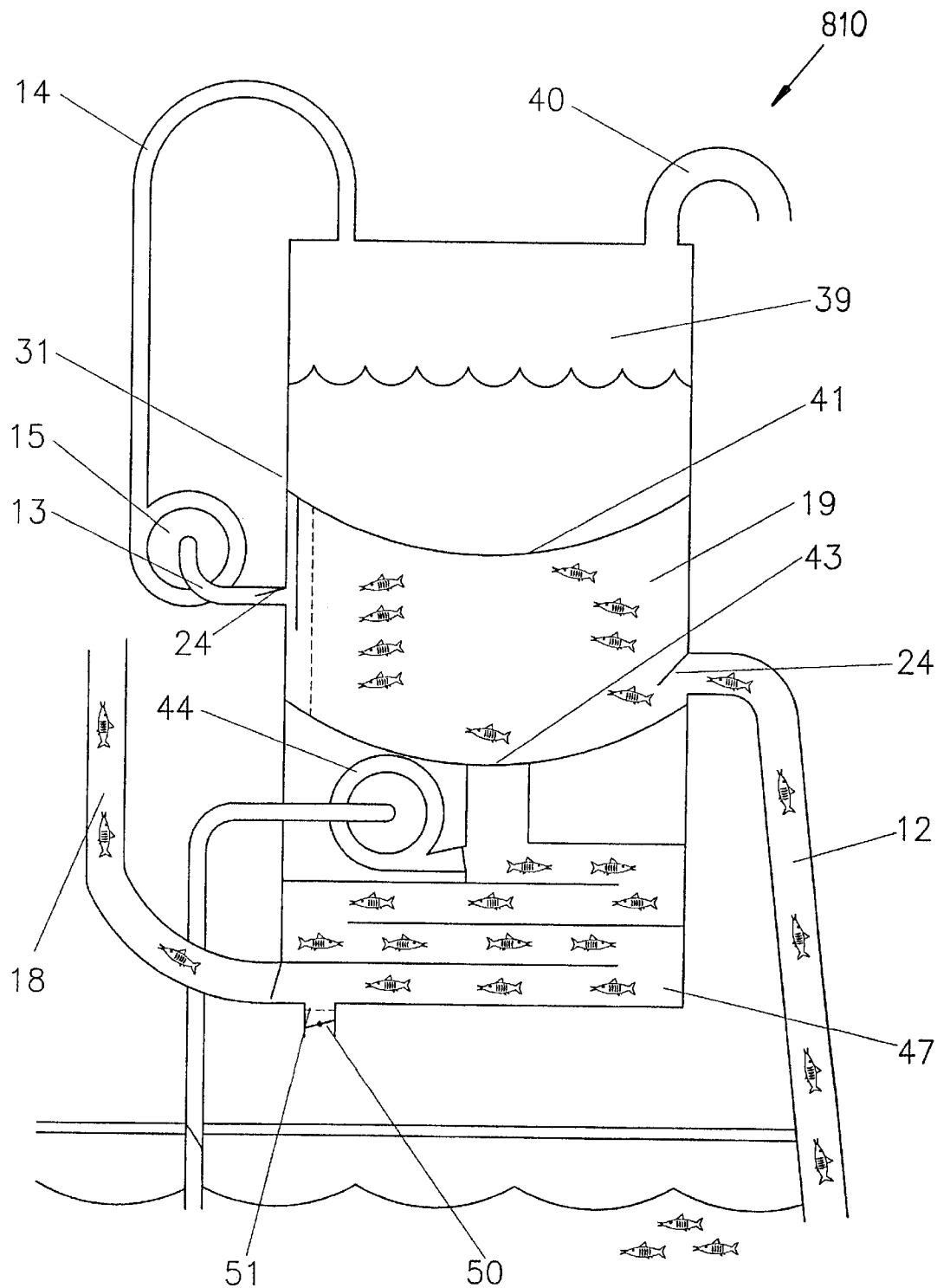
FIG. 8 is a schematic view of an apparatus for collecting live fish according to another embodiment of the invention.
Figure 9:
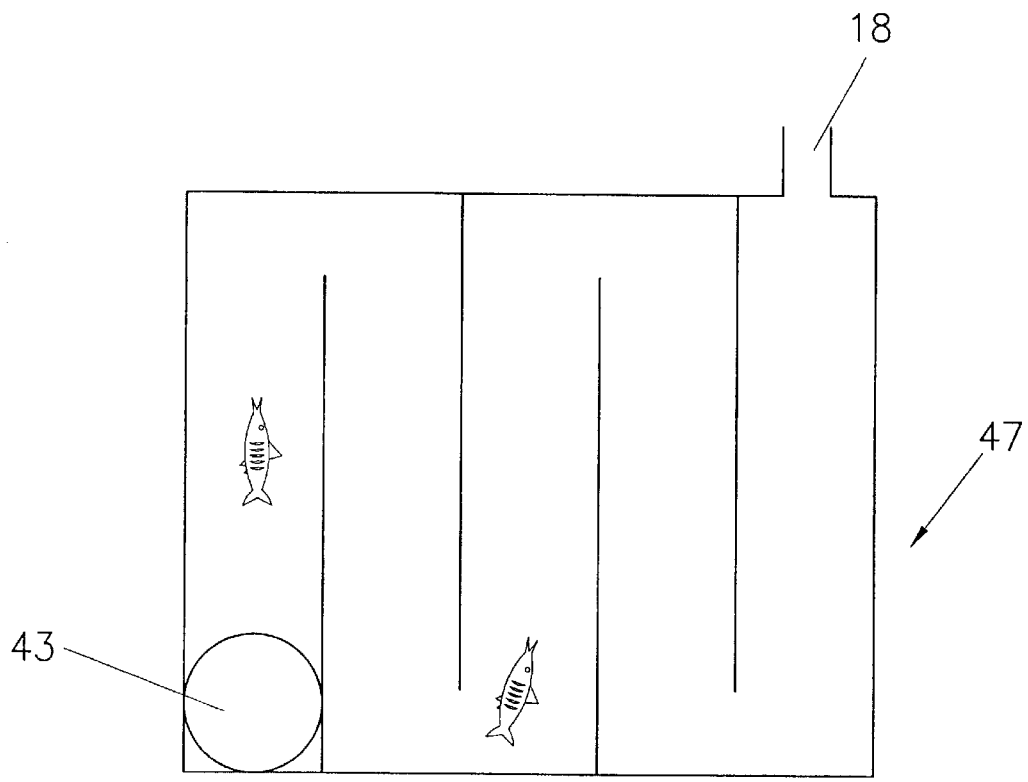
FIG. 9 is an end view of a multi-conduit outlet tank.

The apparatus 810 shown in FIG. 8 is very similar to the apparatus shown in FIG. 9. However, the outlet tank of FIG. 8 is very different.

Figure 10:
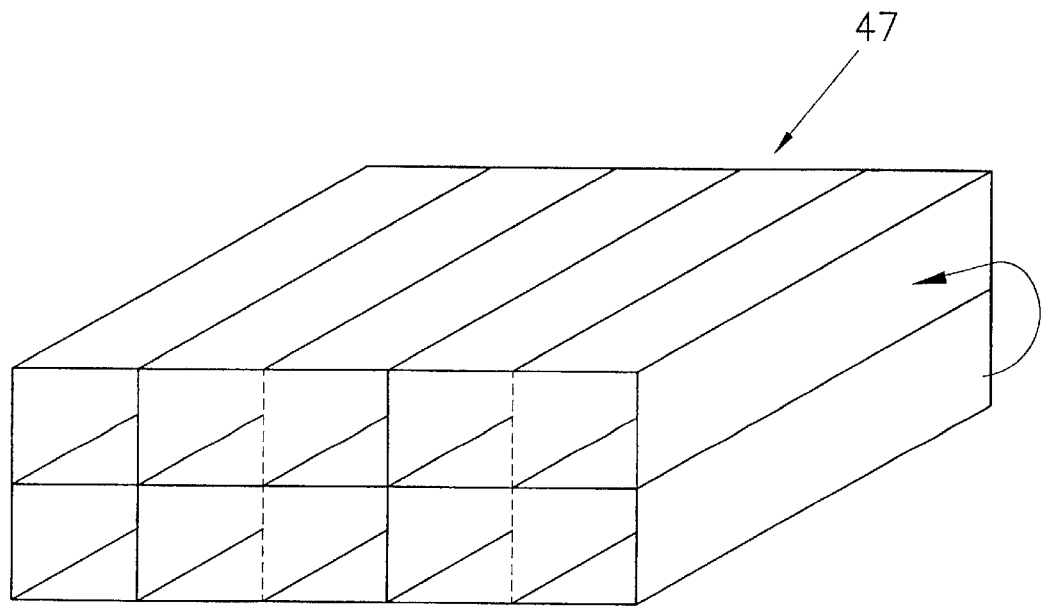
FIG. 10 is a perspective view of the multi-conduit outlet tank according to FIG. 9.

An outlet tank 47, show in more detail in FIGS. 9 and 10 show that the outlet tank is formed from a number of conduits that form a type of labyrinth. This arrangement increases the speed in which water will flow through the conduits. This assists in flushing the fish from the outlet tank 47 into the outlet line 18.

Figure 11:
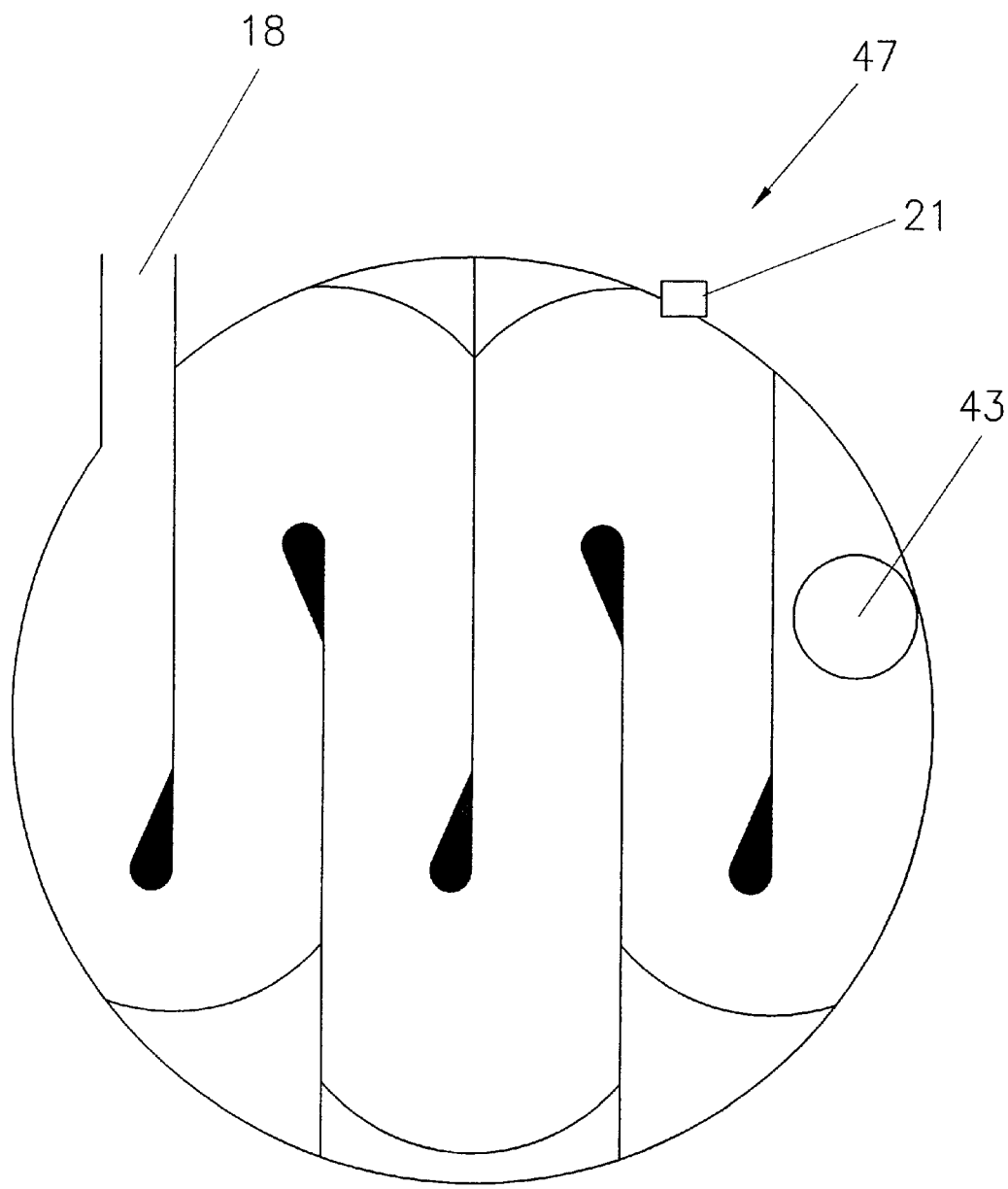
FIG. 11 is an end view of a further embodiment of a multi-conduit outlet tank.

FIG. 11 shows a modification of the tank 47 where the tank is circular when viewed in plan. Also, the turns within the conduits are curved to provided more efficient flow of water through the conduits. This prevents some points of the conduit having a low water flow and others having a high water flow. Fish are therefore not able to stop at the low water flow points.

It should be appreciated that various other changes and modifications made be made to the embodiment described without departing from the spirit or scope of the invention.

We claim:

1. An apparatus for collecting and discharging live marine animals, the apparatus having a collection chamber for holding the marine animals, an inlet conduit having one end extendible into a body of water containing the marine animals, and another end in fluid communication with the chamber, the conduit being sized to allow the marine animals to pass therethrough, a pump to suck water out of the chamber which also causes water to flow through the conduit and into the chamber thereby carrying the marine animals through the conduit and into the chamber, a screen to prevent the marine animals from being sucked into the pump, a discharge outlet through which the marine animals can pass out of the apparatus, and means to push the marine animals through the discharge outlet, wherein the means to push the marine animals through the discharge outlet is a member which can move through the collection chamber and towards the discharge outlet to push the marine animals through the outlet.

2. An apparatus for collecting and discharging live marine animals, the apparatus having a collection chamber for holding the marine animals, an inlet conduit having one end extendible into a body of water containing the marine animals, and another end in fluid communication with the chamber, the conduit being sized to allow the marine animals to pass therethrough, a pump to suck water out of the chamber which also causes water to flow through the conduit and into the chamber thereby carrying the marine animals through the conduit and into the chamber, a screen to prevent the marine animals from being sucked into the pump, a discharge outlet through which the marine animals can pass out of the apparatus, and means to push the marine animals through the discharge outlet, wherein the means to push the marine animals through the discharge outlet is a member which can move through the collection chamber and towards the discharge outlet to push the marine animals through the outlet, an outlet tank, whereby the marine animals can pass from the collection chamber into said outlet tank, said outlet tank having a labyrinth pathway, the means to push the marine animals through the discharge outlet being a pump, said pump pumping water through the labyrinth pathway to push marine animals through the labyrinth pathway and through the discharge outlet.

\* \* \* \* \*